Patented Jan. 3, 1928.

1,654,856

UNITED STATES PATENT OFFICE.

ALEXANDER BLUMFELDT AND HANS KAEGI, OF BASEL, SWITZERLAND, ASSIGNORS TO "SOCIETY OF CHEMICAL INDUSTRY IN BASLE," OF BASEL, SWITZERLAND.

SYNTHETIC RESIN AND PROCESS OF MAKING SAME.

No Drawing. Application filed March 19, 1924, Serial No. 700,427, and in Switzerland April 9, 1923.

It is known in the chemical literature (B. 3, 978; B. 4, 384, 391) that while preparing thioaniline by fusing aniline with sulfur, considerable quantities of resinous by products are obtained. In the above process always two mol. proportions of aniline are employed for one atomic proportion of sulfur; the secondary resinous raw product thus formed is blackish-green and contains about 20.8% of sulfur.

It has been found that by taking more than one atomic proportion of sulfur for two mol. proportions of aniline, there are obtained directly with quantitative yield, valuable resins with shades varying from light to brownish yellow and containing about 40% of sulfur.

In the same way other primary and secondary aromatic amines, as for instance o-toluidine, diphenylamine, α-naphthylamine etc. may produce resins of similar qualities, if they are heated with a quantity of sulfur exceeding that necessary to form simple monosulfides.

The process can not be applied, or only with small success, to p-toluidine and N-alkylated anilines as for instance N-monomethylaniline or N-monoethylaniline.

In some cases it is advantageous to employ catalysts such as iodine. The resins are soluble in hydroaromatic hydrocarbons, such as for instance hexahydrobenzene, hexahydrotoluene partially soluble in chloroform, acetone and benzol alcohol and other organic solvents. If heated further, if necessary in the presence of sulfur, they become insoluble and are no more able to be fused.

Example 1.

279 parts of aniline and 192 parts of sulfur (1 mol. proportion of aniline for 2 atomic proportions of sulfur) are heated first to 185° then gradually to 220°, whereby 68 parts of hydrogen sulfide are developed which correspond exactly to ⅓ of the sulfur employed. The whole is heated for 32 hours.

The product of reaction forms a light yellow transparent resin, which softens little above the ordinary temperature. It dissolves in hydroaromatic hydrocarbons, chloroform and acetone, with difficulty in glacial acetic acid, very little in alcohol and it is insoluble in alkalies, diluted acids and concentrated hydrochloric acid. It yields with alcoholic hydrochloric acid a hydrochloride unstable in the presence of water. The resin contains 36.5% of sulfur.

Example 2.

93 parts of aniline and 96 parts of sulfur (one mol. proportion of aniline for three atomic proportions of sulfur) are heated as indicated in the first example from 185° gradually to 250° C. After 21 hours, 34 parts of hydrogen sulfide corresponding to ⅓ of the sulfur employed have developed. The resulting resin is beautifully yellowish-brown colored, transparent and softens above 100°. Owing to its high percentage of sulfur, it is partly hardened and not completely soluble in acetone. By heating it further, the resin becomes quite insoluble and infusible, it contains 44.08% of sulfur.

Example 3.

321 parts of o-toluidine and 192 parts of sulfur (one mol. proportion of toluidine for two atomic proportions of sulfur) are heated for 12½ hours from 185°–218° C. The product of reaction forms a brown resin, easily fusible, dissolving very little in alcohol, partly in ether and acetone and being quite soluble in chloroform, benzol, toluol and hydroaromatic hydrocarbons.

Example 4.

If 85 parts of diphenylamin and 64 parts of sulfur (one mol. proportion of diphenylamin for four atomic proportions of sulfur) are heated together, the reaction takes place only above 250° C. but it occurs completely at 170° by addition of 0.5 parts of iodine. After half an hour 27 parts of hydrogen sulfide have developed.

The product of reaction forms a dark resin soluble in hydroaromatic hydrocarbons, difficulty soluble in chloroform and acetone and insoluble in all other solvents.

Example 5.

71 parts of α-naphthylamine and 40 parts of sulfur (one mol. proportion of naphthylamine for 2½ atomic proportions of sulfur) are heated in the usual manner. The resin thus obtained is brownish-yellow colored, easily fusible, completely soluble in acetone, chloroform and hydroaromatic hydrocarbons, partly soluble in alcohol and benzol.

What we claim is:

1. Process for the manufacture of synthetic resins, consisting in heating aromatic monoamines of the formula

wherein R=phenyl or naphthyl or a homologue thereof substituted in the o-position to N, $R_1$=H or R, with a quantity of sulfur higher than the proportion required for the formation of the diaryl monosulfide.

2. Process for the manufacture of synthetic resins, consisting in heating aromatic monoamines of the formula

wherein R=phenyl or naphthyl or a homologue thereof substituted in the o-position to N, $R_1$=H or R, with a quantity of sulfur higher than the proportion required for the formation of the diaryl monosulfide, in the presence of iodine as a catalyst.

3. As new products the herein described synthetic resinous reaction products which may be produced by the reaction of a quantity of sulphur higher than the proportion required for the formation of the diaryl monosulfide, which are soluble in hydroaromatic hydrocarbons, such as hexahydrobenzine, hexahydrotoluene, and partly soluble in acetone, partly in benzol, toluol, alcohol, chloroform and other organic solvents and which are capable of being transformed, by further heating alone or in presence of an excess of sulfur, into the hardened insoluble and infusible state.

In witness whereof we have hereunto signed our names this 6th day of March, 1924.

ALEXANDER BLUMFELDT.
HANS KAEGI.